US009955705B2

(12) United States Patent
Christensen et al.

(10) Patent No.: US 9,955,705 B2
(45) Date of Patent: May 1, 2018

(54) METHOD OF PRODUCING A COMPOSITION CONTAINING CASEINOMACROPEPTIDE

(71) Applicant: ARLA FOODS AMBA, Viby J (DK)

(72) Inventors: Jesper Christensen, Silkeborg (DK); Hans Henrik Holst, Videbæk (DK)

(73) Assignee: ARLA FOODS AMBA, Viby J (DK)

( * ) Notice: Subject to any disclaimer, the term of this patent is extended or adjusted under 35 U.S.C. 154(b) by 0 days. days.

(21) Appl. No.: 14/442,648

(22) PCT Filed: Nov. 15, 2013

(86) PCT No.: PCT/EP2013/073980
§ 371 (c)(1),
(2) Date: May 13, 2015

(87) PCT Pub. No.: WO2014/076252
PCT Pub. Date: May 22, 2014

(65) Prior Publication Data
US 2016/0058025 A1 Mar. 3, 2016

Related U.S. Application Data

(60) Provisional application No. 61/726,724, filed on Nov. 15, 2012.

(30) Foreign Application Priority Data

Nov. 15, 2012 (EP) .................................. 12192731

(51) Int. Cl.
| | |
|---|---|
| *A23C 9/14* | (2006.01) |
| *A23C 9/142* | (2006.01) |
| *A23J 3/10* | (2006.01) |
| *A23C 21/00* | (2006.01) |
| *A23J 1/20* | (2006.01) |
| *A23L 33/19* | (2016.01) |

(52) U.S. Cl.
CPC ............ *A23C 9/1425* (2013.01); *A23C 21/00* (2013.01); *A23J 1/20* (2013.01); *A23J 1/205* (2013.01); *A23J 3/10* (2013.01); *A23L 33/19* (2016.08); *A23C 2210/206* (2013.01); *A23V 2002/00* (2013.01)

(58) Field of Classification Search
CPC . A23C 9/1425; A23C 21/00; A23C 2210/206; A23J 3/10; A23J 1/20; A23J 1/205; A23V 2002/00; A23L 33/19
USPC ........ 426/271, 478, 479, 580, 583, 656, 657
See application file for complete search history.

(56) References Cited

U.S. PATENT DOCUMENTS

| | | | | |
|---|---|---|---|---|
| 5,075,424 A | * | 12/1991 | Tanimoto | ........... C07K 14/4732 530/322 |
| 5,278,288 A | | 1/1994 | Kawasaki et al. | |
| 5,968,586 A | * | 10/1999 | Etzel | ....................... A23J 1/205 426/271 |
| 2002/0183489 A1 | | 12/2002 | Davis et al. | |

FOREIGN PATENT DOCUMENTS

| | | |
|---|---|---|
| JP | 04-316450 | 11/1992 |
| JP | H06-507173 | 8/1994 |
| WO | 89/04608 | 6/1989 |
| WO | 92/18142 | 10/1992 |
| WO | 9814071 A1 | 4/1998 |
| WO | 9918808 A1 | 4/1999 |
| WO | 2010/144821 | 12/2010 |
| WO | 2012012237 A1 | 1/2012 |

OTHER PUBLICATIONS

LaClair, Caitlin E. et al., "Purification and Use of Glycomacropeptide for Nutritional Management of Phenylketonuria," Journal of Food Science, vol. 74, No. 4, 2009, pp. E199-E206.
Tanimoto, Morimasa et al., "Large-scale Preparation of κ-Casein Glycomacropeptide from Rennet Casein Whey," Bioscience Biotechnology Biochemistry, vol. 56(1), 1992, pp. 140-141.
Thomas, Corinna et al., "Precipitation behaviour of caseinomacropeptides and their simultaneous determination with whey proteins by RP-HPLC," International Dairy Journal, vol. 16, 2006, pp. 285-293.
Xu, Yue et al., "Separation of bovine immunoglobulin G and glycomacropeptide from dairy whey," Process Biochemistry, vol. 36, 2000, pp. 393-399.
International Search Report for International Application No. PCT/EP2013/073980, dated May 9, 2014, 5 pages.
International Preliminary Report on Patentability for International Application No. PCT/EP2013/073980, dated Dec. 23, 2014, 8 pages.
Response to Written Opinion for International Application No. PCT/EP2013/073980, dated Nov. 3, 2014, 9 pages.
Li et al., "Technical Note: Comparison of Chromatographic Profile of Glycomacropeptide from Cheese Whey Isolated Using Different Methods," J. Dairy Sci. 2004, 87:174-177.
National Drinking Water Clearinghouse "Tech Brief, Membrane Filtration", Mar. 1999, (8 pages).
Brody, "Biological activities of bovine glycomacropeptide," British Journal of Nutrition (2000), 84, Suppl. 1, S39-S46.

* cited by examiner

*Primary Examiner* — Leslie Wong
(74) *Attorney, Agent, or Firm* — Casimir Jones, S.C.; Lisa V. Mueller

(57) ABSTRACT

The present invention pertains to a method of producing caseinomacropeptide (CMP)-containing compositions in high yield and having a very low content of phenylalanine (Phe). More specifically, the method involves subjecting a whey derived feed to a combination of ultrafiltration and subsequent cation exchange.

13 Claims, 3 Drawing Sheets

METHOD OF PRODUCING A COMPOSITION CONTAINING CASEINOMACROPEPTIDE

CROSS-REFERENCE TO RELATED APPLICATIONS

This is a U.S. national stage entry of International Patent Application No. PCT/EP2013/073980, filed on Nov. 15, 2013, which claims priority to European Patent Application No. 12192731.3, filed on Nov. 15, 2012 and U.S. Patent Application No. 61/726,724, filed on Nov. 15, 2012, the entire contents of all of which are fully incorporated herein by reference.

FIELD OF THE INVENTION

The present invention pertains to a method of producing caseinomacropeptide (CMP)-containing compositions in high yield and having a very low level of phenylalanine (Phe). More specifically, the method involves subjecting a whey derived feed to a combination of ultrafiltration and subsequent cation exchange chromatography.

BACKGROUND

CMP is a highly heterogeneous peptide due to a variety of glycosylation patterns and different extents of glycosylations by galactosamine, galactose and o-sialic acid. For this reason CMP does not have a single charge but in reality a distribution of charges exists.

CMP is a unique, naturally occurring peptide that contains no Phe. CMP is e.g. formed during cheese-making when chymosin specifically cleaves κ-casein between the 105 to 106 amino acid residues. Para-κ-casein (residues 1 to 105) coagulates, forming cheese curd, while CMP (residues 106 to 169) remains in the whey. CMP is the $3^{rd}$ most abundant protein in sweet whey, after β-lactoglobulin (BLG) and α-lactalbumin (ALA).

The lack of Phe makes CMP an interesting protein source for persons suffering from phenylketonuria (PKU).

Several attempts to isolate CMP from whey have been described in the prior art.

U.S. Pat. No. 5,278,288 discloses a method for producing CMP, wherein a cheese whey is subjected to cation exchange and the non-bound fraction is subsequently subjected to ultrafiltration at low pH, whereby the monomeric CMP and other impurities are isolated in the ultrafiltration permeate. The pH of the resulting permeate is finally adjusted to pH 7, which leads to the formation of CMP oligomers, and the CMP oligomers are concentrated by ultrafiltration. The Phe-content of the resulting composition is not mentioned in U.S. Pat. No. 5,278,288.

WO 99/18808 discloses another method of recovering CMP. More specifically, WO 99/18808 describes a process where cheese whey is subjected to two ion exchange steps of opposite polarity performed in sequence. The above-mentioned U.S. Pat. No. 5,278,288 is discussed in the background section of WO 99/18808, and here it is mentioned that the CMP recovery of the method of U.S. Pat. No. 5,278,288 is uneconomically low.

WO 98/14071 discloses a method of producing CMP-compositions. This method involves subjecting cheese whey to an anion exchange process and subsequently to a second ion exchange process which may be a cation or anion exchange process. The resulting CMP composition is said to have a Phe-content of at most 0.5% (w/w) relative to the total amount of amino acids determined after protein hydrolysis by hydrochloric acid.

SUMMARY OF THE INVENTION

Contrary to the general understanding in the art (see e.g. WO 99/18808, page 2), the present inventors have discovered that the combination of ultrafiltration and cation exchange can lead to an economical process of separating CMP from whey-derived feeds. This, however, requires that the ultrafiltration step is performed before the cation exchange step, and not as in U.S. Pat. No. 5,278,288 which discloses a cation exchange step followed by an ultrafiltration step.

By using the present invention, CMP may be economically isolated in both very high yield and with a very low content of Phe.

Thus, an aspect of the invention pertains to a method of producing a caseinomacropeptide-containing composition having a low content of phenylalanine, the method comprising the steps of
 a) providing a whey-derived feed comprising caseinomacropeptide (CMP) and at least one additional protein, said whey-derived feed having a pH of at most 4,
 b) subjecting said whey-derived feed to ultrafiltration (UF) using an ultrafiltration filter allowing the passage of monomeric CMP, thereby providing a UF permeate and UF retentate, which UF permeate is enriched with respect to CMP,
 c) contacting a first composition derived from said UF permeate with a cation exchange material, and
 d) collecting the fraction of the first composition which is not bound to the cation exchange material, thereby obtaining the CMP-containing composition.

In the context of the present invention, the term "caseinomacropeptide" or "CMP" pertains to the peptide which may e.g. be released from κ-casein upon exposure to chymosin, e.g. during cheese-making. The term CMP encompasses both glycosylated and non-glycosylated forms of CMP. In the scientific literature CMP is also sometimes referred to as caseinoglycomacropeptide (cGMP) or glycomacropeptide (GMP).

At low pH, CMP exists as single CMP molecules, also referred to a "monomeric CMP". At higher pH, the single CMP molecules start to aggregate, thus forming CMP dimers (a complex of two single CMP molecules) or CMP oligomers (complexes of more than two single CMP molecules).

In the context of the present invention, a composition having a low content of phenylalanine (Phe) contains at most 0.5% (w/w) Phe relative to the total amount of protein of the composition. As described herein, even a lower content of Phe may be preferred. The Phe content of a composition is determined according to ISO 13903:2005 (Animal feeding stuffs—Determination of amino acids content).

DETAILED DESCRIPTION OF THE INVENTION

Figure 1:
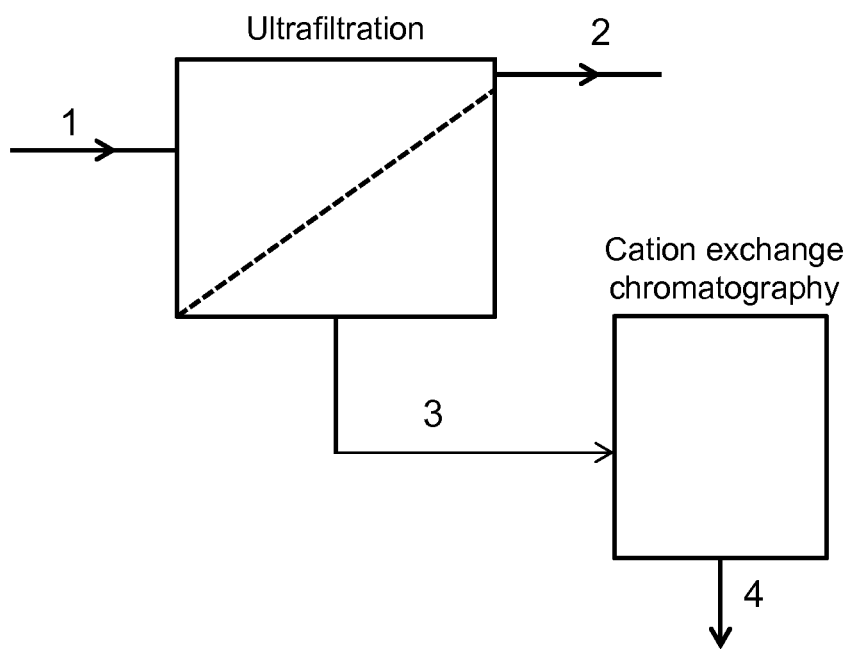
FIG. 1 is a schematic illustration of an embodiment of the invention where the UF permeate (3) is used as the first composition.

An aspect of the invention pertains to a method of producing a caseinomacropeptide-containing composition having a low content of phenylalanine, the method comprising the steps of
 a) providing a whey-derived feed comprising caseinomacropeptide (CMP) and at least one additional protein, said whey-derived feed having a pH of at most 4,
 b) subjecting said whey-derived feed to ultrafiltration using an ultrafiltration filter which allows for the passage of monomeric CMP, thereby providing a UF permeate and a UF retentate, which retentate is enriched with respect to CMP,
 c) contacting a first composition derived from said UF permeate with a cation exchange material, and
 d) collecting the fraction of the first composition which is not bound to the cation exchange material, thereby obtaining the CMP-containing composition.

The whey-derived feed is the liquid feed which is to be subjected to ultrafiltration. The whey-derived feed may for example be one of the process streams which are typically obtained during processing of whey.

In the context of the present invention, the term "whey" pertains to the liquid fraction which is obtained when casein is coagulated by enzymatic cleavage of casein, and particularly kappa-casein, as it e.g. occurs during rennet-based cheese production.

In a whey-derived feed at least 50% (w/w) of the total protein originates from whey. In some preferred embodiments of the invention at least 90% (w/w), and preferably substantially all, of the total protein of the whey-derived feed originates from whey.

The whey is preferably whey of mammalian milk, such as e.g. milk from human, cow, sheep, goat, buffalo, camel, llama, horse and/or deer. In some preferred embodiments of the invention the whey-derived feed is derived from bovine milk.

In some preferred embodiments of the invention the whey-derived feed is derived from cheese whey or a concentrate thereof. The whey-derived feed may for example consist of cheese whey or a protein concentrate thereof.

In the context of the present invention, the term "protein concentrate" of a liquid pertains to a liquid composition or powdered composition containing substantially all of the proteins of the original liquid but less water and optionally also less salt, carbohydrate, and other small molecules. Protein concentrates may e.g. be prepared by evaporation or by ultrafiltration using a low-molecular cut-off membrane.

In some embodiments of the invention, the whey-derived feed is derived from a beta-lactoglobulin-reduced feed or a protein concentrate thereof.

In other preferred embodiments of the invention the whey-derived feed is derived from whey obtained from rennet-coagulated casein or caseinate or a concentrate thereof. The whey-derived feed may for example consist of whey from rennet-coagulated casein or caseinate or a concentrate thereof. Such whey is for example obtained during cheese production based on micellar casein isolate instead of milk.

The CMP content of the whey-derived feed may vary and depends on which specific whey-derived feed is used.

In some preferred embodiments of the invention the whey-derived feed contains an amount of CMP of at least 1% (w/w) relative to the total amount of protein. For example, the whey-derived feed may contain an amount of CMP of at least 5% (w/w) relative to the total amount of protein. Preferably, the whey-derived feed contains an amount of CMP of at least 10% (w/w) relative to the total amount of protein. The whey-derived feed may e.g. contain an amount of CMP of at least 15% (w/w) relative to the total amount of protein.

The whey-derived feed may for example contain an amount of CMP in the range of 1-60% (w/w) relative to the total amount of protein. For example, the whey-derived feed may contain an amount of CMP in the range of 5-50% (w/w) relative to the total amount of protein. Preferably, the whey-derived feed contains an amount of CMP in the range of 10-40% (w/w) relative to the total amount of protein. The whey-derived feed may e.g. contain an amount of CMP in the range of 15-30% (w/w) relative to the total amount of protein.

The amount of CMP and the amount of total protein of a composition, e.g. a whey-derived feed or a related product, is preferably determined as described in Thomä et al (Thomä, C., Krause, I. and Kulozik, U. (2006). Precipitation behaviour of caseinomacropeptides and their simultaneous determination with whey proteins by RP-HPLC. International Dairy Journal, 16, 285-293).

As said, the whey-derived feed contains at least one additional protein, and typically at least several additional proteins. The additional proteins normally comprise proteins which inherently are present in whey.

In some preferred embodiments of the invention the at least one additional protein comprises at least one protein selected from the group consisting of immunoglobulin G, immunoglobulin M, bovine serum albumin (BSA), beta-lactoglobulin, alpha-lactalbumin, beta casein, casein-derived peptides, milk fat globule membrane (MFGM) proteins, and a combination thereof.

It should be noted that in the context of the present invention, the term "casein-derived peptides" does not encompass CMP even though CMP is also derived from casein.

For example, the at least one additional protein may comprise at least two proteins selected from the group consisting of immunoglobulin G, immunoglobulin M, bovine serum albumin (BSA), beta-lactoglobulin, alpha-lactalbumin, beta casein, casein-derived peptides, milk fat globule membrane (MFGM) proteins, and a combination thereof.

The whey-derived feed may further contain other components which are normally found in whey, such as salts, fat, lactose and other carbohydrates.

Generally, it is preferred that the whey-derived feed only contains small amounts of casein, and preferably substantially no casein at all.

In some embodiments of the invention the whey-derived feed contains a total amount of casein of at most 3% (w/w) relative to the total amount of protein.

For example, the whey-derived feed may contain an amount of casein of at most 1% (w/w) relative to the total amount of protein. Preferably, the whey-derived feed contains an amount of casein of at most 0.1% (w/w) relative to the total amount of protein. The whey-derived feed may e.g. contain an amount of casein of at most 0.01% (w/w) relative to the total amount of protein.

In some preferred embodiments of the invention the whey-derived feed contains a total amount of protein of at least 0.2% (w/w) relative to the weight of the whey-derived feed. For example, the whey-derived feed may contain a total amount of protein of at least 0.8% (w/w) relative to the weight of the whey-derived feed. Preferably, the whey-derived feed contains a total amount of protein of at least 2% (w/w) relative to the weight of the whey-derived feed. The whey-derived feed may for example contain a total amount of protein of at least 5% (w/w) relative to the weight of the whey-derived feed.

In some embodiments of the invention the whey-derived feed contains a total amount of protein in the range of 0.2-20% (w/w) relative to the weight of the whey-derived feed. For example, the whey-derived feed may contain a total amount of protein in the range of 0.8-15% (w/w) relative to the weight of the whey-derived feed. Preferably, the whey-derived feed contains a total amount of protein in the range of 2-14% (w/w) relative to the weight of the whey-derived feed. The whey-derived feed may for example contain a total amount of protein in the range of 4-10% (w/w) relative to the weight of the whey-derived feed, such as e.g. in the range of 4-8% (w/w).

It is preferred that the whey-derived feed has a pH which favours the dissociation of oligomeric CMP complexes into monomeric CMP. The whey-derived feed may for example have a pH in the range pH 1-4.

In some embodiments of the invention, the whey-derived feed has a pH in the range of 1.5-3.8. For example, the whey-derived feed may have a pH in the range of 2.0-3.6. The whey-derived feed may e.g. have a pH in the range of 2.5-3.5, such as e.g. in the range of 2.8-3.2.

Unless it is stated otherwise, the pH values mentioned herein are measured at 12 degrees C.

As said, step b) involves subjecting the whey-derived feed to ultrafiltration using an ultrafiltration filter allowing for the passage of monomeric CMP, thereby providing a UF permeate enriched with respect to CMP, and a UF retentate.

The UF permeate is enriched with respect to CMP in the sense that the weight percentage of CMP relative to the total amount of protein in the UF permeate is higher than that of the whey-derived feed. It may happen that the absolute concentration of CMP in the UF permeate is lower than the absolute concentration of CMP in the whey-derived feed, but this is not a problem as long as the ultrafiltration filter retains a larger percentage of the other proteins than it does of the CMP.

Examples of implementation of the ultrafiltration process may for example be found in the European patent EP 1 037 537 61, which is incorporated herein by reference for all purposes.

Step b) may furthermore involve so called diafiltration of the initial UF retentate, to wash out more of the CMP that remains in the retentate. The diafiltration involves diluting the initial UF retentate with a liquid that contains substantially no protein. Useful examples of such a liquid is e.g. water, nanofiltration permeate of whey or milk, or CMP-free UF permeate of whey or milk. Alternatively, the liquid used for dilution may be a reverse osmosis permeate. Reverse osmosis permeates may e.g. be obtained from reverse osmosis of milk, whey, milk UF permeates, or whey UF permeates, and primarily comprises water and small monovalent ions.

The diluted liquid is then subjected to ultrafiltration under the same or similar conditions as required for the initial UF step using the same or a similar UF filter. If necessary, the pH of the diluted retentate should be adjusted to a pH of at most pH 4. The first UF-diafiltration step results in the formation of a first UF-diafiltration permeate and a first UF-diafiltration retentate.

This process may be repeated one or more times, each time diluting the previous retentate, making a pH-adjustment if necessary, and then subjecting the new feed to ultrafiltration, which results in the formation of further CMP enriched UF-diafiltration permeates and further CMP-reduced UF-diafiltration retentates.

The first and further UF-diafiltration permeate are preferably combined with the initial UF permeate to form part of the first composition.

The ultrafiltration filter is the component which is capable of retaining larger molecules on the feed side of the filter and allow for the passage of smaller molecules. The ultrafiltration filter may for example be a thin membrane containing pores having a specific pore size distribution.

The ultrafiltration filter is preferably chosen so that it, during operation, is able to allow for the passage of monomeric CMP through the filter, and so that it is capable of retaining beta-lactoglobulin and preferably also similar whey proteins. As will be known to the person skilled in the art, the separation characteristics of an ultrafiltration filter depend both on its physical and chemical structure, the characteristics of the feed material, and the process parameters by which the ultrafiltration is performed.

In some preferred embodiments of the invention the ultrafiltration filter has a nominal molecular weight cut-off in the range of 5-300 kDa. For example, the ultrafiltration filter may have a nominal molecular weight cut-off in the range of 10-150 kDa. Preferably, the ultrafiltration filter may have a nominal molecular weight cut-off in the range of 20-100 kDa. The ultrafiltration filter may e.g. have a nominal molecular weight cut-off in the range of 30-80 kDa, such as e.g. in the range of 35-60 kDa.

For example, the ultrafiltration filter may have a nominal molecular weight cut-off in the range of 5-100 kDa. Preferably, the ultrafiltration filter may have a nominal molecular weight cut-off in the range of 10-70 kDa. The ultrafiltration filter may e.g. have a nominal molecular weight cut-off in the range of 15-50 kDa, such as e.g. in the range of 20-40 kDa. Alternatively, the ultrafiltration filter may have a nominal molecular weight cut-off in the range of 10-50 kDa.

The nominal molecular weight cut-off of an ultrafiltration filter is typically provided by the filter manufacturer. The "nominal molecular weight cut-off" is defined as the lowest molecular weight solute (in Daltons) in which 90% of the solute is retained by the filter. The "nominal molecular weight cut-off" is determined according to ASTM standard E 1343-90.

The ultrafiltration may e.g. be performed using an ultrafiltration system including a filter arranged for cross flow filtration. Non-limiting examples of useful filter arrangements are spiral-wound ultrafiltration systems, hollow fiber membrane systems, and tubular membrane systems.

In some preferred embodiments the ultrafiltration filter is an ultrafiltration membrane, and preferably a polymeric membrane. Alternatively, the membrane may be a metal membrane or ceramic membrane.

More examples on useful ultrafiltration filters may be found in "Membrane filtration and related molecular separation technologies", APV Systems, Nielsen W. K. (Ed.), Silkeborg Bogtrykkeri A/S (2003), ISBN 8788016757-9788788016758.

The temperature of the whey-derived feed during the ultrafiltration may vary within a broad range, but typically it is preferred that the temperature is within the range of 5-60 degrees C. For example, the temperature of the whey-derived feed during the ultrafiltration may be in the range of 6-40 degrees C., preferably in the range of 7-30 degrees C., an even more preferred in the range of 8-20 degrees C.

It is presently preferred to keep the temperature of the whey-derived feed in the lower end of the above-mentioned intervals. Thus, in some preferred embodiments of the invention the temperature of the whey-derived feed during the ultrafiltration is in the range of 5-20 degrees C., preferably in the range of 7-16 degrees C., an even more preferred in the range of 8-12.

The pressure used during the ultrafiltration may vary depending on the specific type and design of the UF filter which is used. Typically, a transfilter pressure of 0.2-10 bar is used. The transfilter pressure may for example be in the range of 1-8 bar. Alternatively, the transfilter pressure may for example be in the range of 2-6 bar. For example, the transfilter pressure may be in the range of 3-5 bar, such as e.g. about 4 bar.

More details regarding the practical implementation and operation of ultrafiltration can be found in the book "Membrane filtration and related molecular separation technologies", APV Systems, Nielsen W. K. (Ed.), Silkeborg Bogtrykkeri A/S (2003), ISBN 8788016757-9788788016758.

In some preferred embodiments of the invention the UF permeate contains a total amount of CMP of at least 55% (w/w) relative to the total amount of protein. For example, the UF permeate may contain a total amount of CMP of at least 60% (w/w) relative to the total amount of protein. The UF permeate may e.g. contain a total amount of CMP of at least 65% (w/w) relative to the total amount of protein.

The UF permeate preferably has a low content of protein aggregates. Protein aggregates have a higher molecular weight and thus a lower diffusion coefficient than single protein molecules, and are therefore difficult to remove in the subsequent cation exchange step which is used to bind non-CMP protein.

In the context of the present invention, the term "protein aggregates" relates to particles of aggregated protein molecules, which particles have a typical average hydrodynamic diameter of at least 10 nm.

The content of protein aggregates in the UF permeate may be quantified by measuring the level of scattering of the protein aggregates cause in light having a wavelength of 500 nm. The level of scattering is determined using a normal absorbance measurement setup including a standard 1 cm cuvette.

In some preferred embodiments of the invention the UF permeate has an absorbance at 500 nm of at most 0.1 AU (1 cm path length). For example, the UF permeate may have an absorbance at 500 nm of at most 0.05 AU. Preferably, the UF permeate has an absorbance at 500 nm of at most 0.01 AU. Even more preferably, the UF permeate has an absorbance at 500 nm of at most 0.001 AU.

Ideally, the UF permeate has no detectable absorbance at 500 nm at all.

In some preferred embodiments of the invention the UF permeate contains at most 1% (w/w) protein aggregates relative to the total amount of protein in the UF permeate. For example, the UF permeate may contain at most 0.1% (w/w) protein aggregates relative to the total amount of protein. Preferably, the UF permeate contains at most 0.01% (w/w) protein aggregates relative to the total amount of protein. Even more preferably, the UF permeate contains at most 0.001% (w/w) protein aggregates relative to the total amount of protein of the UF permeate.

As said, step c) involves contacting a first composition derived from said UF permeate with a cation exchange material.

In the context of the present invention the term "first composition" relates to the CMP-containing feed that is subjected to the cation exchange during step c). The first composition is preferably a liquid aqueous composition. The first composition is derived from the UF permeate in the sense that at least 50% (w/w) of the CMP of the first composition originates from the UF permeate. If step b) furthermore involves UF diafiltration of the initial UF retentate, the first composition is derived from the UF permeate in the sense that at least 50% (w/w) of the CMP of the first composition originates from the initial UF permeate and one or more subsequent UF-diafiltration permeates.

For example, at least 75% (w/w) of the CMP of the first composition may originate from the UF permeate and any additional UF-diafiltration permeates. Preferably, at least 90% (w/w) of the CMP of the first composition originates from the UF permeate and any additional UF-diafiltration permeates. Even more preferably, at least 90% (w/w) of the CMP of the first composition originates from the UF permeate and any additional UF-diafiltration permeates, such as e.g. all the CMP.

In some preferred embodiments of the invention the first composition is the UF permeate.

However, in other embodiments of the invention, the UF permeate may be subjected to additional process steps which leads to the formation of the first composition. Such additional process steps may e.g. involve temperature adjustments, concentration, pH adjustments, and/or further fractionation.

In some embodiments of the invention the provision of the first composition involves pH adjusting and concentrating the UF permeate and any additional UF-diafiltration permeates.

In other embodiments of the invention the provision of the first composition involves concentrating the UF permeate, e.g. mixed with any additional UF-diafiltration permeates, and adjusting the combined permeates with respect to pH, and conductivity.

In some preferred embodiments of the invention the first composition contains a total amount of CMP of at least 55% (w/w) relative to the total amount of protein. For example, the first composition may contain a total amount of CMP of at least 60% (w/w) relative to the total amount of protein. The first composition may e.g. contain a total amount of CMP of at least 65% (w/w) relative to the total amount of protein.

The first composition may for example contain a total amount of CMP in the range of 55-95% (w/w) relative to the total amount of protein. For example, the first composition may contain a total amount of CMP in the range of 60-90% (w/w) relative to the total amount of protein. The first composition may e.g. contain a total amount of CMP in the range of 65-80% (w/w) relative to the total amount of protein.

As said, the first composition contains at least one additional protein, and typically at least several additional proteins. The additional proteins normally comprise proteins which inherently are present in whey.

In some preferred embodiments of the invention the at least one addition protein comprises at least one protein selected from the group consisting of immunoglobulin G, immunoglobulin M, bovine serum albumin (BSA), beta-lactoglobulin, alpha-lactalbumin, beta casein, casein derived peptides, milk fat globule membrane (MFGM) proteins, and a combination thereof.

For example, the at least one addition protein may comprise at least two proteins selected from the group consisting of immunoglobulin G, immunoglobulin M, bovine serum albumin (BSA), beta-lactoglobulin, alpha-lactalbumin, beta casein, casein derived peptides, milk fat globule membrane (MFGM) proteins, and a combination thereof.

In some embodiments of the invention, at least 50% (w/w) of the total amount of the additional proteins of the first composition originates from the UF permeate and any additional UF-diafiltration permeates. For example, at least 75% (w/w) of the additional proteins of the first composition may originate from the UF permeate and any additional UF-diafiltration permeates. Preferably, at least 90% (w/w) of the additional proteins of the first composition originates from the UF permeate and any additional UF-diafiltration permeates. Even more preferably, at least 90% (w/w) of the additional proteins of the first composition originates from the UF permeate and any additional UF-diafiltration permeates, such as e.g. all the additional proteins.

In some preferred embodiments of the invention the first composition contains a total amount of additional proteins of at most 45% (w/w) relative to the total amount of protein. For example, the first composition may contain a total amount of additional proteins of at most 40% (w/w) relative to the total amount of protein. The first composition may e.g. contain a total amount of additional proteins of at most 35% (w/w) relative to the total amount of protein.

The first composition may for example contain a total amount of additional proteins in the range of 5-45% (w/w) relative to the total amount of protein. For example, the first composition may contain a total amount of additional proteins in the range of 10-40% (w/w) relative to the total amount of protein. The first composition may e.g. contain a total amount of additional proteins in the range of 20-35% (w/w) relative to the total amount of protein.

The first composition may further contain other components which are normally found in whey, such as salts, fat, lactose and other carbohydrates.

Generally, it is preferred that the first composition only contains small amounts of casein, and preferably substantially no casein at all.

In some embodiments of the invention the first composition contains a total amount of casein of at most 0.5% (w/w) relative to the total amount of protein.

For example, the first composition may contain an amount of casein of at most 0.1% (w/w) relative to the total amount of protein. Preferably, the first composition contains an amount of casein of at most 0.01% (w/w) relative to the total amount of protein. The first composition may e.g. contain an amount of casein of at most 0.001% (w/w) relative to the total amount of protein.

In some preferred embodiments of the invention the first composition contains a total amount of protein of at least 0.1% (w/w) relative to the weight of the first composition. For example, the first composition may contain a total amount of protein of at least 0.2% (w/w) relative to the weight of the first composition. Preferably, the first composition contains a total amount of protein of at least 0.5% (w/w) relative to the weight of the first composition. The first composition may for example contain a total amount of protein of at least 1% (w/w) relative to the weight of the first composition.

In some embodiments of the invention the first composition contains a total amount of protein in the range of 0.1-20% (w/w) relative to the weight of the first composition. For example, the first composition may contain a total amount of protein in the range of 0.2-15% (w/w) relative to the weight of the first composition. Preferably, the first composition contains a total amount of protein in the range of 0.5-10% (w/w) relative to the weight of the first composition. The first composition may for example contain a total amount of protein in the range of 1-5% (w/w) relative to the weight of the first composition, such as e.g. in the range of 1-2% (w/w).

Similar to the UF permeate, the first composition preferably has a low content of protein aggregates.

In some preferred embodiments of the invention the first composition has an absorbance at 500 nm of at most 0.1 AU (1 cm path length). For example, the first composition may have an absorbance at 500 nm of at most 0.05 AU. Preferably, the first composition has an absorbance at 500 nm of at most 0.01 AU. Even more preferably, the first composition has an absorbance at 500 nm of at most 0.001 AU.

Ideally, the first composition has no detectable absorbance at 500 nm at all.

In some preferred embodiments of the invention the first composition contains at most 1% (w/w) protein aggregates relative to the total amount of protein in the first composition. For example, the first composition may contain at most 0.1% (w/w) protein aggregates relative to the total amount of protein. Preferably, the first composition contains at most 0.01% (w/w) protein aggregates relative to the total amount of protein. Even more preferably, the first composition contains at most 0.001% (w/w) protein aggregates relative to the total amount of protein of the first composition.

The first composition typically has a pH in the range pH 2-5.

In some embodiments of the invention, the first composition has a pH in the range of 2.3-4.6. For example, the first composition may have a pH in the range of 2.6-4.2. The first composition may e.g. have a pH in the range of 2.8-4.0, such as e.g. in the range of 3.0-3.7.

The first composition may e.g. have a pH in the range of 2.5-4.8. For example, the first composition may have a pH in the range of 3.0-4.6. The first composition may e.g. have a pH in the range of 3.4-4.4, such as e.g. in the range of 3.6-4.2.

In some preferred embodiments of the invention the first composition has a conductivity in the range of 1-8 mS/cm at 12 degrees C.

The "conductivity" (sometimes referred to as the "specific conductance") of an aqueous solution is a measure of the ability of the solution to conduct electricity. The conductivity may e.g. be determined by measuring the AC resistance of the solution between two electrodes and the result is typically given in the unit milliSiemens per cm (mS/cm). The conductivity may for example be measured according to the EPA (the US Environmental Protection Agency) Method No. 120.1.

For example, the conductivity of the first composition may be in the range of 1.5-7 mS/cm at 12 degrees C. In some preferred embodiments of the invention it may be even more preferable that the conductivity of the first composition is in the range of 2-5 mS/cm at 12 degrees C.

The first composition may e.g. have a conductivity in the range of 0.5-5 mS/cm at 12 degrees C. For example, the first composition may e.g. have a conductivity in the range of 0.6-4 mS/cm at 12 degrees C. Alternatively, the first composition may e.g. have a conductivity in the range of 0.8-2 mS/cm at 12 degrees C.

In some preferred embodiments of the invention the first composition has a conductivity in the range of 1-8 mS/cm at 12 degrees C. and a pH in the range of pH 2-5 at 12 degrees C.

In other preferred embodiments of the invention the first composition has a conductivity in the range of 1.5-6 mS/cm at 12 degrees C. and a pH in the range of pH 2.5-3.9 at 12 degrees C.

In further preferred embodiments of the invention the first composition has a conductivity in the range of 2-5 mS/cm at 12 degrees C. and a pH in the range of pH 3.0-3.8 at 12 degrees C.

For example, the first composition may have a conductivity in the range of 0.5-5 mS/cm at 12 degrees C. and a pH in the range of pH 3.0-4.8 at 12 degrees C.

Alternatively, the first composition may have a conductivity in the range of 0.7-3 mS/cm at 12 degrees C. and a pH in the range of pH 3.5-4.5 at 12 degrees C.

In some embodiments of the invention the cation exchange material is packed in a column when contacted with the first composition.

The cation exchange material may for example be suspended in the first composition as free flowing particles when contacted with the first composition.

In some embodiments of the invention the cation exchange material comprises a solid phase and one or more anionic groups, which are capable of binding cations.

Preferably, at least some of the anionic groups are attached to the solid phase.

In some embodiments of the invention the solid phase of the cation exchange material comprises one or more components selected from the group consisting of a plurality of particles, a filter, and a membrane.

The solid phase may for example comprise, or even consist essentially of polysaccharide. Cross-linked polysaccharides are particularly preferred. Examples of useful polysaccharides are cellulose, agarose, and/or dextran.

Alternatively, the solid phase may comprise, or even consist essentially of, a non-carbohydrate polymer. Examples of useful non-carbohydrate polymers are methacrylate, polystyrene, and/or styrene-divinylbenzene.

In some preferred embodiments of the invention the anionic groups may e.g. comprise, or even consist of, strong cation exchange groups such as e.g. sulfonic acid groups. Alternatively, or additionally, the anionic groups may e.g. comprise, or even consist of, weak cation exchange groups such as e.g. carboxylic acid groups.

The optimal protein load per cycle depends on the design of the cation exchange chromatography process and the characteristics of the cation exchange material.

The process conditions during the cation exchange chromatography, including pressure, etc., depend on the actual process implementation, the equipment used and the cation exchange material used.

The temperature of the first composition during step c) is typically sufficiently low to minimize microbial growth and to avoid heat damaging the protein and the cation exchange material, but sufficiently high to provide an acceptable viscosity of the first composition.

In some embodiments of the invention the temperature of the first composition during step c) is in the range of 2-40 degrees C. Preferably, the temperature of the first composition during step c) is in the range of 4-20 degrees C., and even more preferably in the range of 6-15 degrees C.

More details regarding cation exchange chromatography and its industrial implementation can be found in Scopes, which is incorporated herein by reference for all purposes.

Step d) involves collecting the fraction of the first composition which is not bound to the cation exchange material, thereby obtaining the CMP-containing composition.

The collected fraction may be used as the CMP-containing composition as such, or alternatively, it may be subjected to additional process steps, e.g. demineralising and concentrating the composition, and subsequently transforming it into a powder.

Thus, in some preferred embodiments of the invention, the collected fraction is furthermore subjected to one or more of the process step(s) selected from the group consisting of heat treatment, concentration, demineralisation, evaporation of solvent, spray-drying, and substitution of protein-bound cations.

For example, the collected fraction may be subjected to a concentration step.

Alternatively, or additionally, the collected fraction may be subjected to demineralisation, e.g. by diafiltration using an ultrafiltration filter that retains monomeric CMP.

The pH of the collected fraction may be adjusted to a pH above pH 4, e.g. a pH of at least pH 5, prior to concentration or diafiltration. The elevated pH results in the association of monomeric CMP into oligomers, which allows for concentration and/or diafiltration using membranes having a larger pore size.

Alternatively, or additionally, the collected fraction may be subjected to an evaporation step.

Alternatively, or additionally, the collected fraction may be subjected to a spray-drying step.

In some preferred embodiments of the invention the collected fraction is subjected to the following steps:
 i) concentrating, e.g. by ultrafiltration, nanofiltration, or reverse osmosis,
 ii) diafiltration, e.g. against water,
 iii) optionally, another concentration step, e.g. by evaporation,
 iv) pasteurisation, and
 v) spray-drying to convert the pasteurised composition into a powder.

The present method may both be implemented as a batch process or a semi-batch-process.

The CMP-containing composition of the present invention has both a very high CMP purity of and a very low content of Phe.

In preferred embodiments of the invention the method is for producing CMP-containing compositions having a CMP purity of at least 92% (w/w) relative to the total amount of protein of the composition. For example, the method may be for producing CMP-containing compositions having a CMP purity of at least 95% (w/w) relative to the total amount of protein of the composition. Preferably, the method is for producing CMP-containing compositions having a CMP purity of at least 97% (w/w) relative to the total amount of protein of the composition, such as e.g. at least 98% (w/w) or even about 100% (w/w).

An exemplary embodiment of the method of the invention is schematically illustrated in FIG. 1. The whey-derived feed (1) is led to the UF unit and thus subjected to ultrafiltration. The UF step leads to the formation of an UF retentate (2), i.e. the fraction which is retained by the UF filter, and an UF permeate, which is the fraction that has permeated through the UF filter. In this embodiment the UF permeate (3) is used as the first composition which is subjected to cation exchange chromatography. Non-CMP protein impurities of the first composition bind to the cation exchange material (not depicted) and the purified CMP-containing composition (4) is collected.

Figure 2:
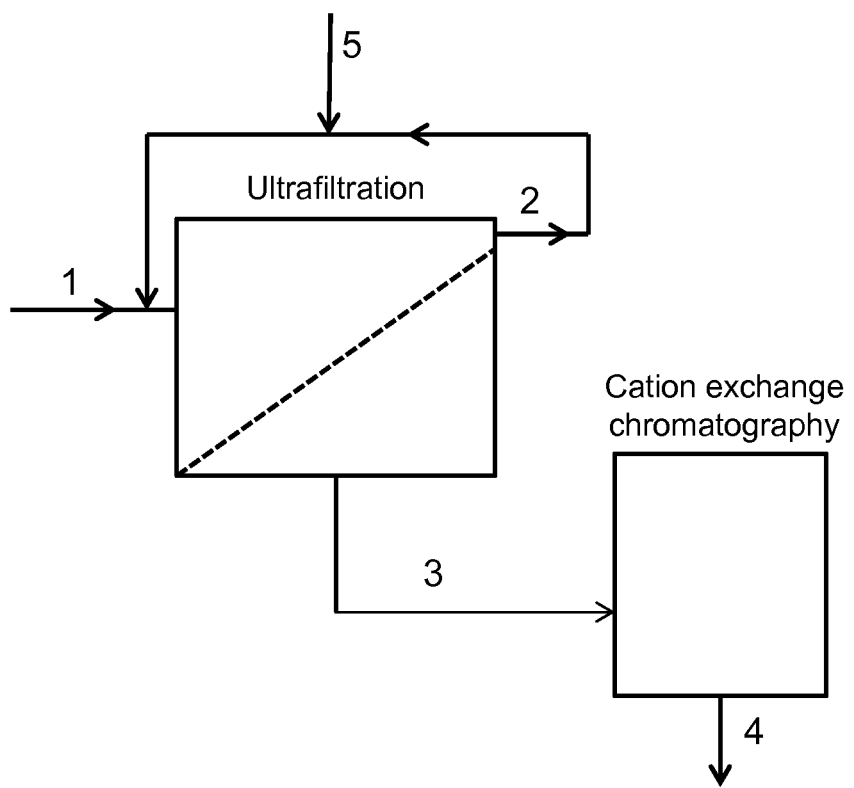
FIG. 2 is a schematic illustration of an embodiment of the invention where the UF permeate (3) is used as the first composition, and wherein the UF retentate (2) is diluted with water (5) and recycled as feed (5) to the ultrafiltration system.

Another exemplary embodiment of the method of the invention is schematically depicted in FIG. 2. Similar to the process of FIG. 1, the whey-derived feed is subjected to ultrafiltration. The resulting CMP-enriched UF permeate (3) is used as the first composition and subjected to cation exchange chromatography. The protein fraction which does not bind to the cation exchange material is collected as the CMP-containing composition. However, in the method of FIG. 2 the UF retentate is furthermore diluted with water (5) and recycled as feed to the UF process, thereby washing out a larger part of the CMP of the original whey-derived feed and recovering this in the UF permeate.

Figure 3:
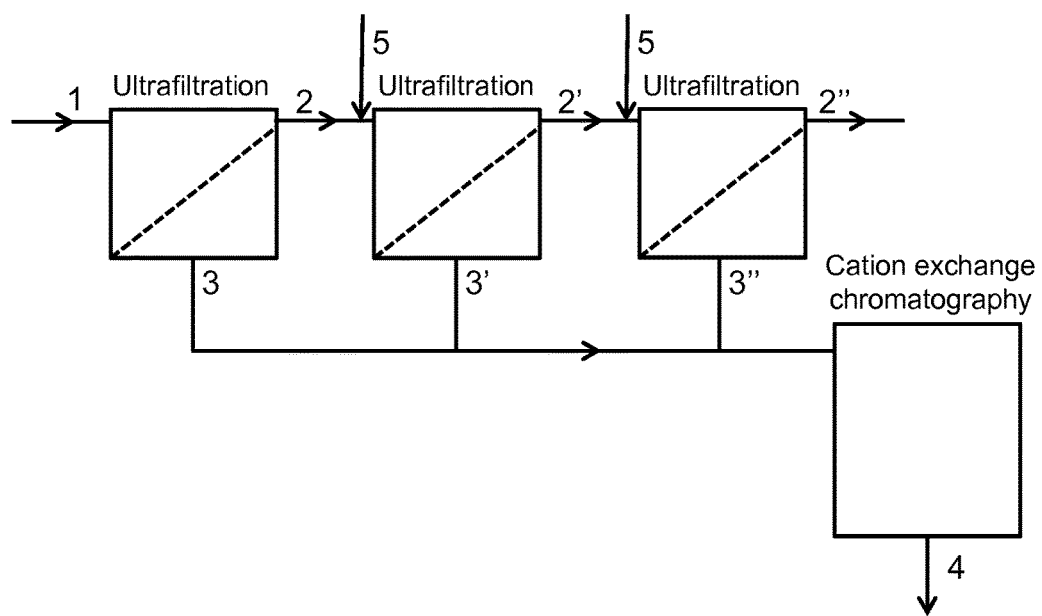
FIG. 3 is a schematic illustration of an embodiment of the invention where three UF units are arranged in sequence, filtering first the whey-derived feed (1), then the UF retentate (2) from the first UF unit diluted with water (5), and finally, the UF retentate (2') from the second UF unit also diluted with water (5). The UF permeates of the three UF units (3, 3', and 3") are combined and used as the first composition.

Yet another exemplary embodiment of the invention is illustrated schematically in FIG. 3. Here, a series of three ultrafiltration units is used in step b). The whey-derived feed (1) is fed to the first UF unit, resulting in a first UF retentate (2) and a first UF permeate (3). The first UF retentate (2) is mixed with water (5) and fed to the second UF unit, resulting in a second UF retentate (2') and a second UF permeate (3'). The second UF retentate (2') is mixed with water (5) and fed to the third UF unit, resulting in a third UF retentate (2") and a third UF permeate (3"). The first second, and third permeate (3, 3', and 3") are combined and used as the first composition, which is subjected to cation exchange chromatography.

Another aspect of the invention pertains to a CMP-containing composition obtainable by the method described wherein.

The CMP-containing composition preferably contains at most 0.5% (w/w) phenylalanine relative to the total amount of protein. For example, the CMP-containing composition may contain at most 0.4% (w/w) phenylalanine relative to the total amount of protein. Preferably, the CMP-containing composition preferably contains at most 0.3% (w/w) phenylalanine relative to the total amount of protein. Even more preferably, the CMP-containing composition preferably contains at most 0.2% (w/w) phenylalanine relative to the total amount of protein, such as at most 0.1% (w/w) phenylalanine relative to the total amount of protein.

In preferred embodiments of the invention the CMP-containing compositions has a CMP purity of at least 92% (w/w) relative to the total amount of protein of the composition. For example, the CMP-containing compositions may have a CMP purity of at least 95% (w/w) relative to the total amount of protein of the composition. Preferably, the CMP-containing compositions has a CMP purity of at least 97% (w/w) relative to the total amount of protein of the composition, such as e.g. at least 98% (w/w) or even about 100% (w/w).

The present invention has been described above with reference to specific embodiments. However, other embodiments than the above described are equally possible within the scope of the invention. The different features and steps of various embodiments and aspects of the invention may be combined in other ways than those described herein unless it is stated otherwise.

EXAMPLES

Example 1: Process Variant of the Invention

Ultrafiltration I—Separation:

12000 liters of whey protein concentrate (WPC) containing 30% dry matter and 24% protein was diluted with demineralized cold water to a dry matter content of 10% and a protein content of 8%. 12 M hydrochloric acid was added until the pH was 2.8. The solution was filtered using 6" spiral wound membranes of the type BN6338 from Synder Filtration, Vacaville, Calif., US, with 31 mil spacer and a nominal cut-off value of 50,000 Daltons. The total membrane area was 3072 $m^2$. The filtration was carried out under the following conditions: The temperature was maintained at 10° C. and the mean pressure was maintained at 4.5 bar with a feeding pressure of 3.5 bar. The pH was maintained at 2.8 by using 12 M hydrochloric acid, and permeate from Ultrafiltration II (see below) was added with the same flow as permeate was removed. The recirculation flow in the loop was 180 $m^3$/h, and the recirculation over the feeding tank was approximately 10 $m^3$/h. After a 10 hour filtration the addition of permeate from Ultrafiltration II was stopped. The mean flux was measured as 8 L/$m^2$ h.

Ultrafiltration II—Diafiltration of the Retentate and Concentration of the Permeate:

The permeate from Ultrafiltration I was collected in a feeding tank to Ultrafiltration II and continuously the pH was adjusted to 6.0 by using 6% sodium hydroxide. Simultaneously with Ultrafiltration I, Ultrafiltration II was carried out using 6" spiral wound membranes of the type HFK-328 6338 from Koch Membrane Systems, Wilmington, Mass., US, with 31 mil spacer and a nominal cut-off value of 5,000 Daltons. The total membrane area was 2304 $m^2$. The filtration was carried out under the following conditions: The temperature was maintained at 10° C. and the mean pressure was maintained at 1.0 to 5.0 bar in order to supply permeate to Ultrafiltration I with the same flow as permeate was removed from Ultrafiltration I. After a 10 hour filtration, i.e. after the stop of Ultrafiltration I, the retentate was collected. The retentate was subsequently subjected to diafiltration in which 70,000 liters of tap water was added with the same flow as filtrate was removed. After the diafiltration, the retentate was concentrated until the protein content in the retentate was 12%. The final volume of the retentate was 3450 liters. The filtration conditions were the same as above. The purity of CMP in the retentate was determined as 79% (79 g CMP per 100 g protein) based on HPLC analysis.

Cation Exchange Chromatography:

For one day of production, 650 liters of the final retentate from Ultrafiltration II was diluted with demineralized cold water to a protein content of 1.24% (1.24 g protein per 100 g solution). The pH in the solution was adjusted to 3.50 using 42% w/w citric acid and the conductivity was adjusted to 2.0 mS/cm using a solution of 2 M NaCl and 2 M KCl. 725 liters of the adjusted protein solution was subjected to cation exchange chromatography using a column packed with 116 liters of SP Sepharose Big Beads Food Grade from GE Healthcare, Uppsala, Sweden.

The Following Conditions were Used for Each Cycle of Cation Exchange Chromatography:

The column was flushed with 290 liters of demineralized cold water at a flow rate of 1300 L/h. The 725 liters of feed solution (the adjusted protein solution) from above was pumped through the column at a flow rate of 1050 L/h and the flow through (non-binding material) was collected in a product tank also denoted as CMP solution. The column was flushed with 232 liters and 58 liters respectively of demineralized water at a flow rate of 1050 L/h and 1300 L/h respectively. A simultaneous elution and Cleaning-in-Place step was carried out by pumping 580 liters of 0.5 M sodium hydroxide through the column at a flow rate of 943 L/h. The column was flushed with 290 liters and 580 liters respectively of demineralized water at a flow rate of 943 L/h and 1300 L/h respectively. The time for one cycle of cation exchange chromatography was 2.6 hours. The relative yield of CMP for the cation exchange chromatography step was 92% (92 g CMP in flow through per 100 g CMP in feed).

Eight cycles of cation exchange chromatography was carried out each day followed by standard ultrafiltration (HFK-328 membranes from Koch Membrane Systems, Wilmington, Mass., US) in order to concentrate the CMP solution in the product tank. Before ultrafiltration the pH in the product tank was adjusted to 6.5 by a mixed solution of potassium hydroxide and sodium hydroxide. A total of 32 cycles of cation exchange chromatography was carried out after which the CMP solution was further concentrated by standard ultrafiltration (HFK-328 membranes from Koch Membrane Systems, Wilmington, Mass., US). The concentrated CMP solution was spray dried using a standard spray dryer and 196 kg of powder was obtained. The composition of the powder with the selected parameters is given in Table 1.

Example 2: Process Variant of the Invention

Ultrafiltration I and II were carried out in a manner similar to that described in Example 1. The CMP purity in the final Ultrafiltration II retentate was determined as 80% (80 g CMP per 100 g protein) based on HPLC analysis.

Cation exchange chromatography was carried out in a manner similar to that described in Example 1, except for the following: the pH of the diluted solution was adjusted to 3.37 and a total of 47 cycles of cation exchange chromatography was carried out. The relative yield of CMP for the cation exchange chromatography step was 90% (90 g CMP in flow through per 100 g CMP in feed). The concentrated CMP solution was spray dried using a standard spray dryer and 357 kg of powder was obtained. The composition of the powder with selected parameters is given in Table 1.

Example 3: Process Variant of the Invention

Ultrafiltration I and II were carried out in a manner similar to that described in Example 1. The CMP purity in the final Ultrafiltration II retentate was determined as 83% (83 g CMP per 100 g protein) based on HPLC analysis.
Cation Exchange Chromatography:

For one day of production, 450 liters of the final retentate from Ultrafiltration II was diluted with demineralized cold water to a protein content of 0.66% (0.66 g protein per 100 g solution). The pH in the solution was adjusted to 3.25 using 30% w/w hydrochloric acid and the conductivity was adjusted to 2.0 mS/cm using a solution of 2 M NaCl and 2 M KCl. 1000 liters of the adjusted protein solution was subjected to cation exchange chromatography using a column packed with 80 liters of SP Sepharose Big Beads Food Grade from GE Healthcare, Uppsala, Sweden.
The Following Conditions were Used for One Cycle of Cation Exchange Chromatography:

The column was flushed with 300 liters of demineralized cold water, 300 liters of 0.50% w/w acetic acid and 200 liters of demineralized cold water at a flow rate of 1300 L/h. The 1000 liters of feed solution from above was pumped through the column at a flow rate of 1300 L/h and the flow through (non-binding material) was collected in a product tank also denoted as CMP solution.

The column was flushed with 200 liters of demineralized cold water at a flow rate of 1300 L/h. A simultaneous elution and Cleaning-in-Place step was carried out by pumping 400 liters of 1.0 M sodium hydroxide through the column at a flow rate of 700 L/h. The column was flushed with 200 liters and 400 liters respectively of demineralized cold water at a flow rate of 700 L/h and 1300 L/h respectively. The time for one cycle of cation exchange chromatography was 2.7 hours. The relative yield of CMP for the cation exchange chromatography step was 77% (77 g CMP in flow through per 100 g CMP in feed). Eight cycles of cation exchange chromatography was carried out each day followed by standard ultrafiltration (HFK-328 membranes from Koch Membrane Systems, Wilmington, Mass., US) in order to concentrate the CMP solution in the product tank. Before ultrafiltration the pH in the product tank was adjusted to 6.5 using a mixed solution of potassium hydroxide and sodium hydroxide. A total of 20 cycles of cation exchange chromatography was carried out after which the CMP solution was further concentrated by standard ultrafiltration (HFK-328 membranes from Koch Membrane Systems, Wilmington, Mass., US). The concentrated CMP solution was spray dried using a standard spray dryer and 78 kg of powder was obtained. The composition of the powder with selected parameters is given in Table 1.

Example 4: Process Variant of the Invention

Ultrafiltration I and II were carried out in a manner similar to that described in Example 1. The CMP purity in the final Ultrafiltration II retentate was determined as 79% (79 g CMP per 100 g protein) based on HPLC analysis.
Cation Exchange Chromatography:

For one day of production, 278 liters of the final retentate from Ultrafiltration II was diluted with demineralized cold water to a protein content of 0.68% (0.68 g protein per 100 g solution). The pH in the solution was adjusted to 3.75 using 30% w/w hydrochloric acid and the conductivity was adjusted to 4.0 mS/cm using a solution of 5 M NaCl. 1000 liters of the adjusted protein solution was subjected to cation exchange chromatography using a column packed with 80 liters of SP Sepharose Big Beads Food Grade from GE Healthcare, Uppsala, Sweden.
The Following Conditions were Used for One Cycle of Cation Exchange Chromatography:

The column was flushed with 300 liters of 1 M NaCl, 300 liters of demineralized cold water, 300 liters of 0.25% w/w acetic acid and 200 liters of demineralized cold water at a flow rate of 1300 L/h. The 1000 liters of feed solution (the adjusted protein solution) from above was pumped through the column at a flow rate of 1300 L/h and the flow through (non-binding material) was collected in a product tank also denoted as CMP solution. The column was flushed with 200 liters of demineralized cold water, 300 liters of 1 M NaCl (elution) and 200 liters of demineralized cold water at a flow rate of 1300 L/h. A Cleaning-in-Place step was carried out by pumping 400 liters of 1.0 M sodium hydroxide through the column at a flow rate of 700 L/h. The column was flushed with 200 liters and 400 liters respectively of demineralized water at a flow rate of 700 L/h and 1300 L/h respectively. The time for one cycle of cation exchange chromatography was 3.3 hours. The relative yield of CMP for the cation exchange chromatography step was 90% (90 g CMP in flow through per 100 g CMP in feed). Five cycles of cation exchange chromatography was carried out each day followed by standard ultrafiltration (HFK-328 membranes from Koch Membrane Systems, Wilmington, Mass., US) in order to concentrate the CMP solution in the product tank. Before ultrafiltration the pH in the product tank was adjusted to 6.5 by a mixed solution of potassium hydroxide and sodium hydroxide. A total of 10 cycles of cation exchange chromatography was carried out after which the CMP solution was further concentrated by standard ultrafiltration (HFK-328 membranes from Koch Membrane Systems, Wilmington, Mass., US). Approximately half of the concentrated CMP solution was spray dried using a standard spray dryer and 24 kg of powder was obtained. The composition of the powder with selected parameters is given in Table 1.

Example 5: Process Variant of the Invention

Ultrafiltration I—Separation:
600 liters of Beta-lactoglobulin reduced WPC concentrate containing 23% dry matter, 20% protein and with a CMP purity of approximately 24% (24 g CMP per 100 g protein) was diluted with demineralized cold water to a dry matter content of 11% and a protein content of 8.9%. 30% w/w hydrochloric acid was added until the pH was 2.2. The solution was filtered using 6" spiral wound membranes of the type BN6338 from Synder Filtration, Vacaville, Calif., US, with 31 mil spacer and a nominal cut-off value of 50,000 Daltons. The total membrane area was 64 m². The filtration was carried out under the following conditions: The temperature was maintained at 10° C. and the mean pressure was maintained at 2.0 bar (across two filter elements) with a feeding pressure of 3.0 bar. The pH was maintained at 2.2 by using 30% w/w hydrochloric acid and permeate from Ultrafiltration II was added with the same flow as permeate was removed. The recirculation flow in the loop was 30 m³/h, and the recirculation over the feeding tank was approximately 5 m³/h. After an 8.5 hour filtration the addition of permeate from Ultrafiltration II was stopped. The mean flux was measured as 22 L/m² h.

Ultrafiltration II—Diafiltration of the Retentate and Concentration of the Permeate:
The permeate from Ultrafiltration I was collected in a feeding tank to Ultrafiltration II. Simultaneously with Ultrafiltration I, Ultrafiltration II was carried out using 6" spiral wound membranes of the type VT6338 from Synder Filtration, Vacaville, Calif., US, with 31 mil spacer and a nominal cut-off value of 3,000 Daltons. The total membrane area was 64 m². The filtration was carried out under the following conditions: The temperature was maintained at 10° C. and the mean pressure was maintained at 1.0-1.5 bar (across two filter elements) with a feeding pressure of 0.5-1.0 bar. The pressure conditions were adjusted in order to generate permeate with the same flow as permeate from Ultrafiltration I was removed. After a 8.5 hour filtration, i.e. after the stop of Ultrafiltration I, the retentate was concentrated using the same conditions as above and 600 liters of retentate was obtained. The retentate was subsequently adjusted to pH 6.3 using 4% sodium hydroxide and subjected to diafiltration in which 3,300 liters of tap water was added with the same flow as filtrate was removed. The filtration conditions were the same as above. 820 liters of retentate was obtained with a dry matter content of 3.4% and a protein content of 2.9%. The purity of CMP in the retentate was determined as 72% (72 g CMP per 100 g protein) based on HPLC analysis.

Cation Exchange Chromatography:
Cation exchange chromatography was carried out similar to the description given in Example 1, except for the following: The final retentate from Ultrafiltration II was diluted with demineralized cold water to a protein content of 1.14% (1.14 g protein per 100 g solution), pH in the diluted solution was adjusted to 3.47, the conductivity was adjusted to 2.3 mS/cm. 805 liters of feed solution was pumped through the column during each cycle and a total of two cycles of cation exchange chromatography was carried out. The relative yield of CMP for the cation exchange chromatography step was 80% (80 g CMP in flow through per 100 g CMP in feed). Approximately half of the concentrated CMP solution was spray dried using a standard spray dryer and 6 kg of powder was obtained. The composition of the powder with selected parameters is given in Table 1.

TABLE 1

Composition of the CMP-containing products of Examples 1-5.

| | Product of: | | | | |
|---|---|---|---|---|---|
| | Ex. 1 | Ex. 2 | Ex. 3 | Ex. 4 | Ex. 5 |
| Dry matter (% w/w of product) | 96.0 | 95.5 | 95.8 | 93.5 | 95.3 |
| Protein (% of product) | 76.8 | 76.9 | 77.5 | 75.5 | 82.2 |
| Protein (% of dry matter) | 80.0 | 80.6 | 80.9 | 80.7 | 86.3 |
| CMP purity (% of protein) | ~98 | ~98 | ~98 | ~98 | ~98 |
| Phenylalanine (% of protein) | 0.15 | 0.19 | 0.09 | 0.23 | 0.26 |
| Fat (% of product) | 0.11 | 0.23 | <0.1 | 0.22 | <0.1 |
| Lactose (% of product) | <0.1 | <0.1 | <0.1 | <0.1 | <0.1 |
| Ash (% of product) | 7.4 | 7.3 | 6.9 | 6.8 | 6.5 |

Example 6: Comparison with the Prior Art

U.S. Pat. No. 5,278,288A discloses a method which combines cation exchange chromatography and ultrafiltration, in the order stated, for producing CMP. For example in the first cation exchange step, cheese whey is contacted with a cation exchange resin and the non-adsorbed material is collected. Subsequently the non-adsorbed material is subject to ultrafiltration at a pH below 4 using a membrane with a cut-off value of 10,000 to 50,000 Daltons, whereby CMP is obtained in the filtrate. Finally the filtrate is pH adjusted and standard ultrafiltration is carried out for concentrating the CMP solution before spray drying. Hence the two critical separation steps are cation exchange chromatography and ultrafiltration at pH<4, in the order stated. In the present invention the order of the two separation steps is reversed. Here ultrafiltration at a pH of at most 4 is carried out first ("Ultrafiltration I" in the examples) followed by cation exchange chromatography in which CMP is obtained in the non-adsorbed material (also denoted "flow through" or "non-binding material"). The order of the separation steps in the present invention has several advantages when compared to the order of the separation steps given in U.S. Pat. No. 5,278,288A.

A first advantage of the present invention is that the purity of CMP (% CMP of total protein) in the final product using the process of the present invention is much higher compared to the CMP purity obtained in U.S. Pat. No. 5,278, 288A. Purity numbers from 80% to 88% are given in U.S. Pat. No. 5,278,288A. By the process of the present invention a purity of approximately 98% or above can be achieved. Due to the very high purity in the CMP product obtained by the present invention, the product is suitable as a nutritional ingredient for patients suffering from phenylketonuria, also indicated by the very low levels of phenylalanine present in the product. A CMP purity of 80% to 88%, as in the product obtained by the process from U.S. Pat. No. 5,278,288A, correlates with a content of phenylalanine which is too high for phenylketonuria patients.

A second advantage of the present invention is that it uses less ion exchange material per kg isolated CMP than the method of U.S. Pat. No. 5,278,288A or any other method of the prior art which provides a comparable high purity of CMP. Following the present invention, the first ultrafiltration step removes a large proportion of the non-CMP whey proteins. Thereby, the weight ratio between non-CMP whey proteins and CMP in the feed solution to the cation exchange chromatography step is much lower than in U.S. Pat. No. 5,278,288A, and hence a much lower volume of cation exchange resin per mass unit of CMP is needed to bind of all non-CMP whey proteins.

A third advantage of the present invention is that the overall yield of CMP (% mass of CMP in final product compared to mass of CMP in the starting material) using the process of the present invention is much higher compared to the overall yield of CMP obtained in U.S. Pat. No. 5,278,288A. Using Example 2 in U.S. Pat. No. 5,278,288A and assuming a protein content in the Gouda whey of 6.2 g/L and a CMP content of 18% relative to the total protein content, an overall CMP yield of 0.73% can be calculated, based on the obtained 81 mg of CMP in the final product. Using Example 2 for the present invention and assuming a CMP content of 18% relative to the total protein content in the starting material, an overall CMP yield of 50% can be calculated, obtained by combining a yield of 63% from the ultrafiltration step and a yield of 80% covering the cation exchange chromatography step to the final powder product.

A fourth advantage of the present invention is that it increases the number of ion exchange cycles that a batch of ion exchange resin can endure before it is worn out—relative to U.S. Pat. No. 5,278,288A. Ion exchange chromatography is a relatively expensive unit operation and the cost of the ion exchange resin is a significant part of the overall processing costs. Extending the life-time of the ion exchange material is therefore an interesting approach to improving the overall process-economy of the production of high purity CMP-containing products.

The invention claimed is:

1. A method of producing a caseinomacropeptide-containing composition having a low content of phenylalanine (Phe), said composition having a range of 0.1%-0.5% (w/w) Phe relative to the total amount of protein of the composition, the method comprising the steps of:

a) providing a whey-derived feed comprising caseinomacropeptide (CMP) and at least one additional protein, said whey-derived feed having a pH in the range of 1-4,
b) subjecting said whey-derived feed to ultrafiltration using an ultrafiltration filter (UF) allowing the passage of monomeric CMP, thereby providing a UF permeate and a UF retentate, which UF permeate is enriched with respect to CMP,
c) contacting a first composition derived from said UF permeate with a cation exchange material, and
d) collecting the fraction of the first composition which is not bound to the cation exchange material, thereby obtaining the CMP-containing composition.

2. The method according to claim 1, wherein the whey-derived feed is derived from cheese whey or a concentrate thereof.

3. The method according to claim 1, wherein the whey-derived feed comprises whey obtained from rennet coagulated casein or caseinate, or a concentrate thereof.

4. The method according to claim 1, wherein the whey-derived feed contains a total amount of CMP of at least 1% (w/w) relative to the total amount of protein.

5. The method according to claim 1, wherein the at least one additional protein is selected from the group consisting of immunoglobulin G, immunoglobulin M, bovine serum albumin (BSA), beta-lactoglobulin, alpha-lactalbumin, beta casein, casein derived peptides, milk fat globule membrane (MFGM) proteins, and a combination thereof.

6. The method according to claim 1, wherein the whey-derived feed contains a total amount of protein having a range of 0.2%-20% (w/w) relative to the weight of the whey-derived feed.

7. The method according to claim 1, wherein the ultrafiltration filter has a nominal molecular weight cut-off in the range of 5-300 kDa.

8. The method according to claim 1, wherein the first composition contains a total amount of CMP having a range of 55%-95% (w/w) relative to the total amount of protein.

9. The method according to claim 1, wherein the first composition contains a total amount of protein of at least 0.1% (w/w).

10. The method according to claim 1, wherein the first composition has a pH in the range of pH 2-5.

11. The method according to claim 1, wherein the first composition has a conductivity in the range of 1-8 mS/cm.

12. The method according to claim 1, further comprising concentrating the collected fraction.

13. The method according to claim 1, further comprising spray-drying the collected fraction.

* * * * *